United States Patent
Landt

(10) Patent No.: US 7,146,091 B2
(45) Date of Patent: Dec. 5, 2006

(54) METHOD AND SYSTEM FOR AUTOMATED SIMULATION OF CABLE FAILURE IN A NETWORK

(75) Inventor: Matthew Eugene Landt, Round Rock, TX (US)

(73) Assignee: Internatioanal Business Machines Corporation, Armonk, NY (US)

( * ) Notice: Subject to any disclaimer, the term of this patent is extended or adjusted under 35 U.S.C. 154(b) by 159 days.

(21) Appl. No.: 10/439,038

(22) Filed: May 15, 2003

(65) Prior Publication Data

US 2004/0228604 A1   Nov. 18, 2004

(51) Int. Cl.
G02B 6/00   (2006.01)

(52) U.S. Cl. .................... 385/147; 398/12
(58) Field of Classification Search .......... 385/45, 385/147; 398/12
See application file for complete search history.

(56) References Cited

U.S. PATENT DOCUMENTS

| | | | |
|---|---|---|---|
| 4,223,217 A | | 9/1980 | Bongard et al. |
| 4,376,566 A | | 3/1983 | Blackington |
| 4,647,844 A | * | 3/1987 | Biegon et al. ............ 324/627 |
| 4,705,348 A | | 11/1987 | Matsunaga et al. |
| 4,910,396 A | * | 3/1990 | Grove ........................ 250/229 |
| 4,989,946 A | | 2/1991 | Williams et al. |
| 5,202,943 A | | 4/1993 | Carden et al. |
| 5,305,136 A | | 4/1994 | Smith |
| 5,309,564 A | * | 5/1994 | Bradley et al. ............ 398/45 |
| 5,389,963 A | * | 2/1995 | Lepley et al. ............ 725/144 |
| 5,739,694 A | * | 4/1998 | Grochulski ............... 324/556 |
| 5,754,053 A | * | 5/1998 | Bourdeau .................. 324/533 |
| 5,798,647 A | * | 8/1998 | Martin et al. ............ 324/503 |
| 5,835,646 A | | 11/1998 | Yoshimura et al. |
| 5,862,362 A | * | 1/1999 | Somasegar et al. ............ 703/21 |
| 6,002,502 A | * | 12/1999 | Pomp et al. .................. 398/45 |
| 6,137,608 A | * | 10/2000 | White ............................ 398/1 |
| 6,154,447 A | * | 11/2000 | Vedder ........................ 370/244 |
| 6,244,908 B1 | | 6/2001 | Hammond et al. |
| 6,430,352 B1 | * | 8/2002 | Jennings et al. ............ 385/147 |
| 6,464,517 B1 | * | 10/2002 | Jones .......................... 439/138 |
| 6,490,062 B1 | * | 12/2002 | Besati et al. .................. 398/4 |
| 6,647,208 B1 | * | 11/2003 | Kirby .......................... 398/45 |
| 6,658,540 B1 | * | 12/2003 | Sicola et al. ................ 711/162 |
| 6,714,698 B1 | * | 3/2004 | Pfeiffer et al. ................ 385/16 |

(Continued)

*Primary Examiner*—Ellen E. Kim
(74) *Attorney, Agent, or Firm*—Sawyer Law Group LLP

(57) ABSTRACT

A method, system and device for simulating cable failures in a network are disclosed. In a first aspect, a plurality of optical cables which couple a plurality of devices within the network to each other are provided. The method and system includes providing at least one programmable device on one of the plurality of optical cables. The at least one programmable device allows for controlled simulated cable failures. In a second aspect, the network comprises: a plurality of devices and a plurality of optical cables for interconnecting the devices. The network also includes at least one programmable device coupled to one of the optical cables, the at least one programmable device allows for controlled simulated cable failures. In a third aspect, the programmable device is used in a network for simulating cable failures in the network. The network includes a plurality of devices and a plurality of optical cables for interconnecting the devices. The programmable device comprises a plurality of switch devices, each coupled to one of the plurality of optical cables, and control logic for controlling the plurality of switches, wherein the device allows for controlled simulated cable failures. The method and system in accordance with the present invention provides an inexpensive, efficient, controlled and automated method for simulating optical cable failures.

10 Claims, 3 Drawing Sheets

U.S. PATENT DOCUMENTS

| | | | |
|---|---|---|---|
| 6,724,993 B1 * | 4/2004 | Koike et al. | 398/9 |
| 6,959,126 B1 * | 10/2005 | Lofland et al. | 385/16 |
| 2002/0021873 A1 | 2/2002 | Patzelt | |
| 2002/0102059 A1 | 8/2002 | Cho et al. | |
| 2003/0021281 A1 * | 1/2003 | Tanaka et al. | 370/401 |
| 2004/0042406 A1 * | 3/2004 | Wu et al. | 370/238 |

* cited by examiner

METHOD AND SYSTEM FOR AUTOMATED SIMULATION OF CABLE FAILURE IN A NETWORK

FIELD OF THE INVENTION

The present invention relates generally to optical systems and more particularly to simulating cable failures when testing optical devices.

BACKGROUND OF THE INVENTION

FIG. 1 is a block diagram of a conventional network 10. The network 10 includes a computer system 12 which is coupled to a first fabric connectivity switch 14 by one optical cable 16 and is coupled to a storage device 18 by another optical cable 20. The storage device 18 is also coupled to a second fabric connectivity switch 22 by an optical cable 24. Finally, the fabric connectivity switch 14 is coupled to the second switch by an optical cable 26.

Simulating cable failures in a network such as network 10 is critical to development, testing, and quality assurance for devices utilized in the network. Conventional approaches to simulating cable failures include simulation via cables being manually pulled, providing expensive optical attenuators, or utilizing the existing switches that are provided for fabric connectivity and not for the simulation of cable failures. Each of these conventional approaches is described herein below.

Manual Simulation of Cable Failures

Simulating cable failures manually is not an adequate approach because manual simulations are both inaccurately timed and also expensive to simulate over a period of time because persons must be employed to actually pull the cable. In human terms, the timing can not be much more accurate than within 0.5 seconds. Proper cable testing should be able to constantly provide a length of failure to within 0.001 seconds or better. Also, to stimulate hundreds of cable failures, one or more persons must work night and day. The method and system in accordance with the present invention, in contrast, allows for cable failures to be simulated automatically during any time period and at any time, thereby freeing up human and capital resources.

Utilization of Attenuators for Simulating Cable Failures

Attenuators can also be utilized for simulating cable failures. An attenuator can provide an automated method for cable failures, but its simulation functions by turning down the level of light until it is a very small percentage of the proper signal. This is not as accurate as complete loss of light which the method and system in accordance with the present invention provides. Attenuators are also very expensive devices that are used for many other purposes than just cable failures.

Utilization of Fabric Connectivity Switches for Simulating Cable Failures

A third conventional approach is to utilize fabric connectivity switches for simulating cable failures and determining optical connectivity. Fabric connectivity switches utilized for this purpose are typically very expensive. The ports on the fabric connectivity switch can be taken offline, thus simulating a cable failure. These switches are not intended for such test operations. Also, a fabric connectivity switch is a device to be tested in this environment. Using the fabric connectivity switch to simulate its own cable failure could alter the outcome and may not give accurate information. This environment is also intelligent so that if the fabric connectivity switches are connected, trying to simulate a cable failure between an adapter and a disk with a fabric connectivity switch is impossible.

Accordingly, what is needed is a system and method for simulating cable failures when testing optical devices which is less expensive than current approaches and can be automated. The present invention addresses such a need.

SUMMARY OF THE INVENTION

A method, system and device for simulating cable failures in a network are disclosed. In a first aspect, a plurality of optical cables which couple a plurality of devices within the network to each other are provided. The method and system includes providing at least one programmable device on one of the plurality of optical cables. The at least one programmable device allows for controlled simulated cable failures.

In a second aspect, the network comprises: a plurality of devices and a plurality of optical cables for interconnecting the devices. The network also includes at least one programmable device coupled to one of the optical cables, the at least one programmable device allows for controlled simulated cable failures.

In a third aspect, the programmable device is used in a network for simulating cable failures in the network. The network includes a plurality of devices and a plurality of optical cables for interconnecting the devices. The programmable device comprises a plurality of switch devices, each coupled to one of the plurality of optical cables, and control logic for controlling the plurality of switches, wherein the device allows for controlled simulated cable failures. The method and system in accordance with the present invention provides an inexpensive, efficient, controlled and automated method for simulating optical cable failures.

DETAILED DESCRIPTION

The present invention relates generally to optical systems and more particularly to stimulating cable failures when testing optical devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system in accordance with the present invention provides an inexpensive, efficient, controlled and automated method for simulating optical cable failures. Although the method and system in accordance with the present invention is described as being utilized for fiber channel I/O cable failure testing, it is not limited to this one environment and can be utilized for all optical cable failure simulators.

Figure 1:
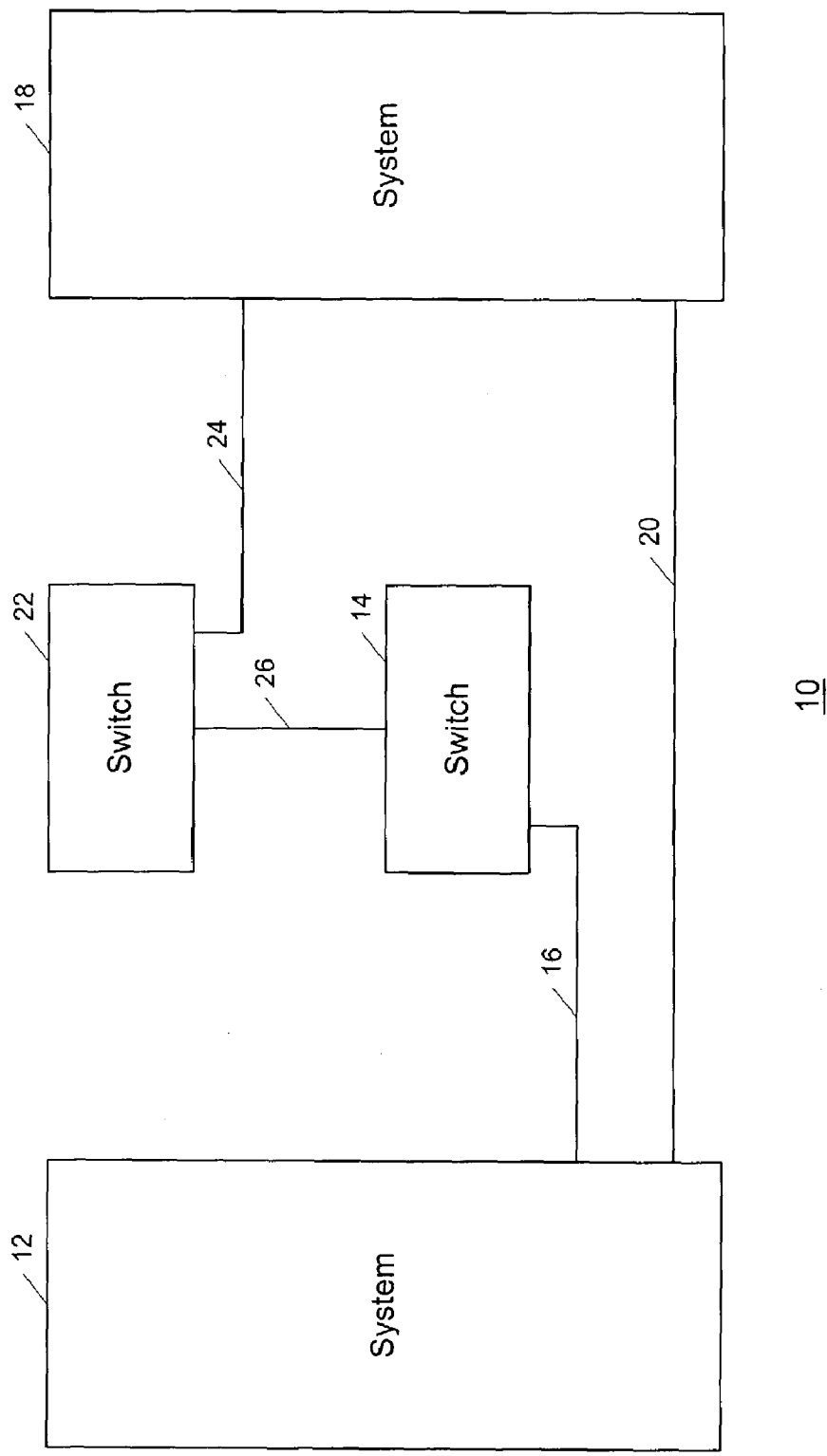
FIG. 1 is a block diagram of a conventional network.
Figure 2:
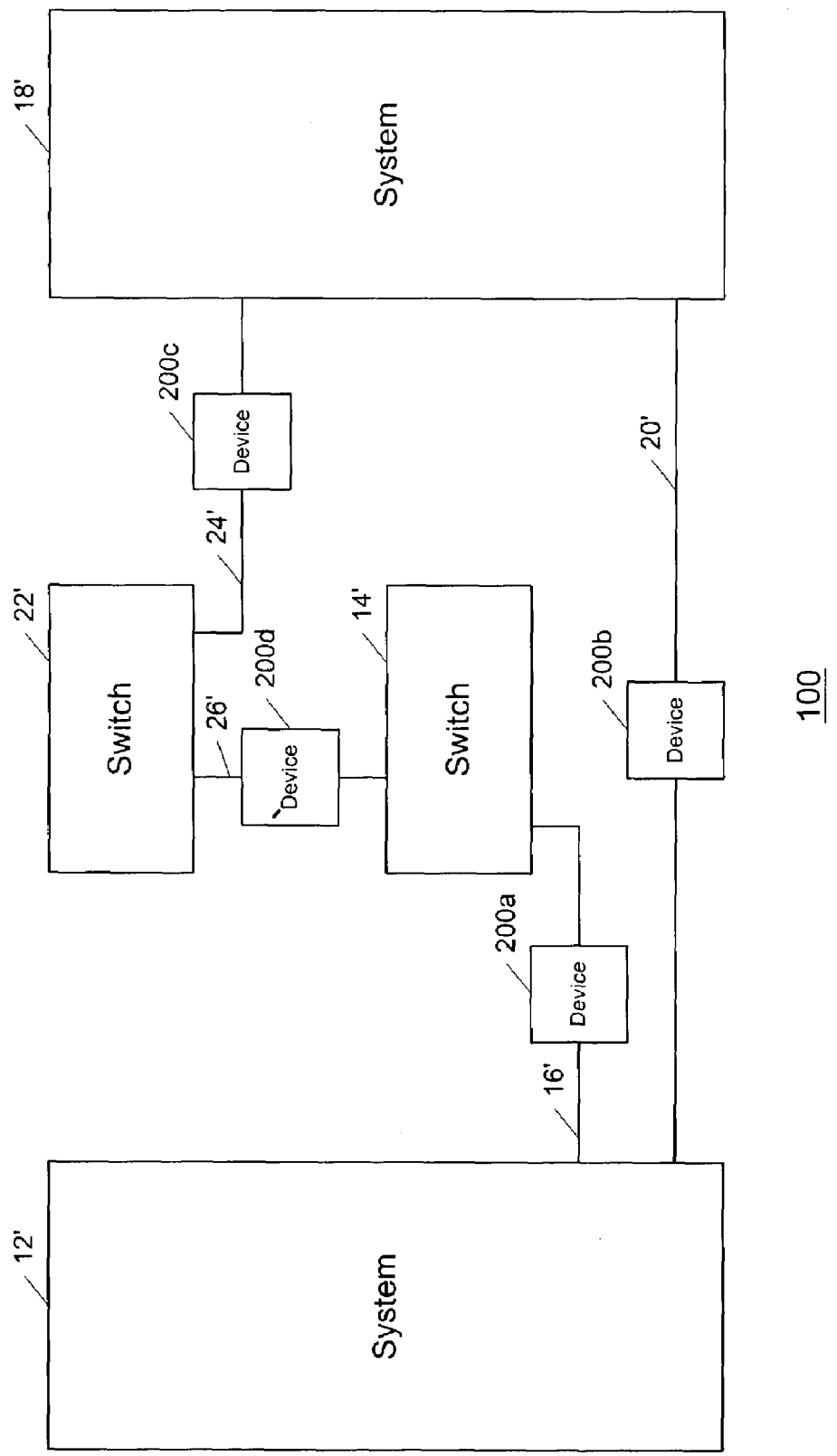
FIG. 2 is a block diagram of a network in accordance with the present invention which is coupled together utilizing optical cable.

FIG. 2 is a block diagram of a network 100 in accordance with the present invention which is coupled together utilizing optical cable. The network 100 has similar elements to those shown in FIG. 1. That is, the network 100 includes a computer system 12', a first fabric connectivity switch 14', a second fabric connectivity switch 22', and a storage device 18'. It also includes a plurality of devices 200a–200d which in this embodiment are coupled to the optical cables. Each of the devices 200a–200d can be connected either directly to another device, a fabric connectivity switch, or a hub.

As is seen, a first device, 200a, is coupled to one optical cable 16'. A second device, 200b, is coupled to the optical cable 20'. A third device, 200c, is coupled to the optical cable 24'. Finally, a fourth device, 200d, is coupled to the optical cable 26'. Each of the devices 200a–200d can be connected in-line at the point where a simulated cable failure is desired. Thereafter the device 200 can be controlled via electrical switches, serial interface and commands, programmed automated commands, or even manual switches, thus allowing for time-controlled and number-controlled cable failure simulations which can greatly surpass conventional human-initiated cable failure simulations in both quantity and precision. It should be understood that a device 200 could be connected in any or all of the positions depicted in the network, the critical feature being a device connected to a cable between two entities.

Figure 3:
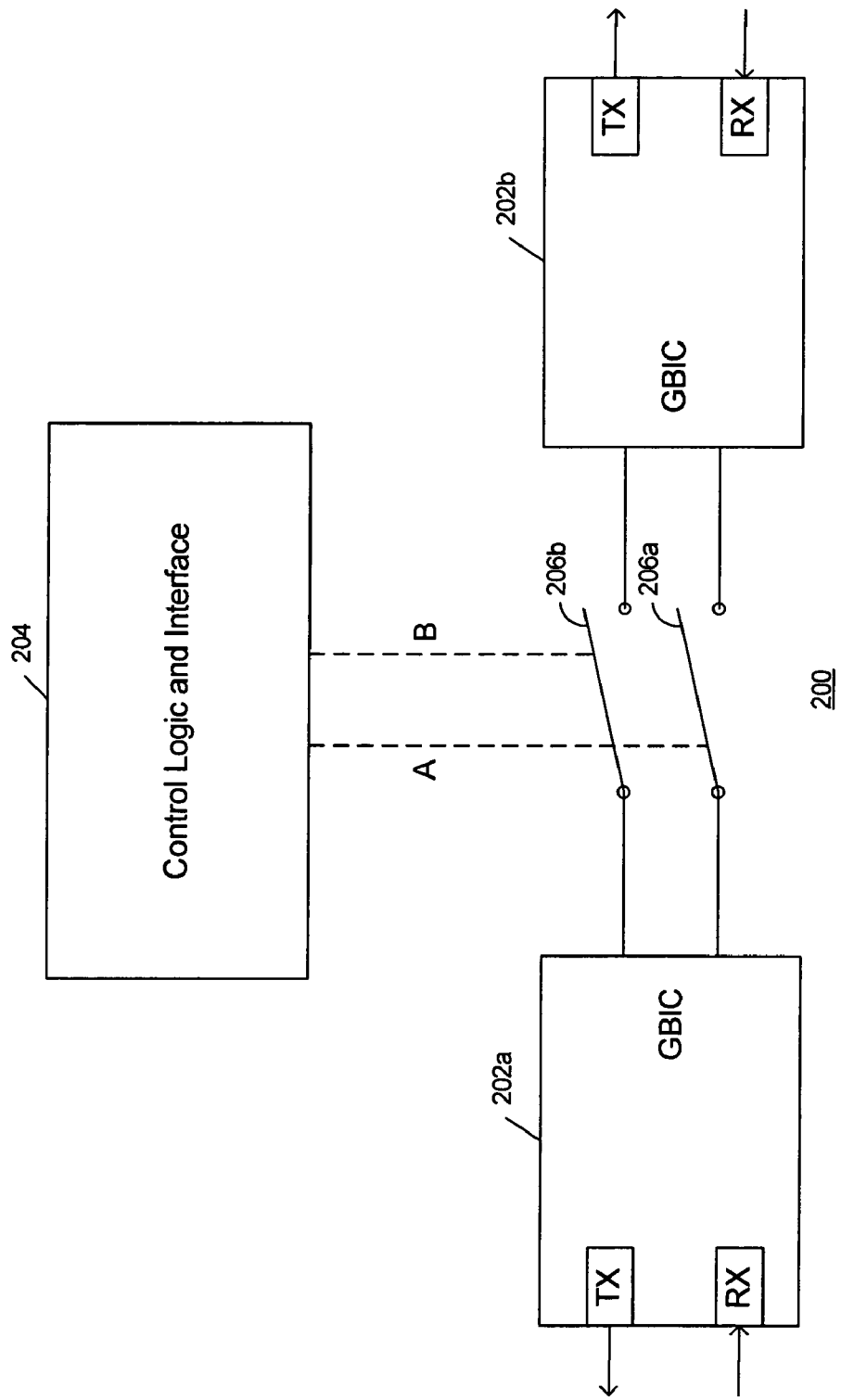
FIG. 3 illustrates an embodiment of a device which could be utilized in accordance with the present invention.

For a more detailed description of the features of a device 200, refer to the following discussion. FIG. 3 illustrates an embodiment of a device 200 which could be utilized in accordance with the present invention. The device 200 comprises a programmed circuitry/control logic 204 coupled between optical to gigabit interface converters (GBICs) 202a and 202b connected on each side of the programmed circuitry/control logic and interface 204. Gigabit interface converters (GBICs) are optical to electrical converters utilized for fiber channel I/O. The control logic 204 controls the functioning of switches 206a and 206b coupled between the GBICs 202a and 202b to simulate cable failures in a controlled manner. The logic 204 can provide automatic commands or could be coupled to an interface to receive and provide the commands to provide the failure simulation.

The logic 204 can be implemented in a variety of ways to provide these automatic commands. For example, in the simplest embodiment, a serial interface such as RS 232 interface is provided to the logic 204. The logic 204 could include software which can be utilized to control the switches between the two GBICs 202a and 202b. A device coupled to the serial interface (such as a server) could provide signals that would cause the software within the logic 204 to exercise the switches for a predetermined duration time, for a predetermined number of times between failures and for a predetermined number of failures. In a second embodiment, the logic could include a timing chip and a processor built into the logic 204. Programmable code within the processor can be initiated by a user interface to exercise the switches for a predetermined duration time, for a predetermined number of times between failures and for a predetermined number of failures. Accordingly, there are a variety of systems/embodiments that could be utilized within the logic 204 to control these factors in simulating cable failures.

The method and system in accordance with the present invention provides an inexpensive, efficient, controlled and automated method for simulating optical cable failures. Accordingly, through the use of a programmable device which can simulate cable failures in a time-controlled and number-controlled manner, an effective system of cable failure simulation is provided.

Although the present invention has been described in accordance with the embodiments shown, one of ordinary skill in the art will readily recognize that there could be variations to the embodiments and those variations would be within the spirit and scope of the present invention. For example, although the present invention has been described for use in a fiber I/O channel failure configuration, one of ordinary skill in the art recognizes that a system and method in accordance with the present invention could be utilized in a variety of environments and their use would be within the spirit and scope of the present invention. In addition, although GBICs are disclosed based on the failure simulation, one of ordinary skill in the art recognizes that many modifications may be made by one of ordinary skill in the art without departing from the spirit and scope of the appended claims.

What is claimed is:

1. A method for simulating a cable failure in a network, the method comprising:
   providing a network including a plurality of devices coupled to one another via a plurality of optical cables, wherein one or more of the plurality of network devices comprises any one of a switch operable to provide fabric connectivity among devices within the network, a computer system, or a storage device; and
   coupling at least one programmable device on one of the plurality of optical cables, the at least one programmable device operable to be controlled to simulate a cable failure on the one optical cable having the programmable device coupled thereto.

2. The method of claim 1, wherein the programmable device provides time-controlled simulated cable failures.

3. The method of claim 1, wherein the programmable device is coupled on the one optical cable at a point in the network where a simulated cable failure is desired.

4. The method of claim 1, wherein the at least one programmable device comprises a switch, control logic, and a converter.

5. The method of claim 4, wherein the converter comprises a gigabit interface converter (GBIC).

6. A network comprising:
   a plurality of devices, wherein one or more of the plurality of devices comprises any one of a switch operable to provide fabric connectivity among devices within the network, a computer system, or a storage device;
   a plurality of optical cables for interconnecting the plurality of devices; and
   at least one programmable device coupled to one of the plurality of optical cables, the at least one programmable device operable to be controlled to simulate a cable failure on the one optical cable having the programmable device coupled thereto.

7. The network of claim 6, wherein the programmable device provides time-controlled simulated cable failures.

8. The network of claim 6, wherein the programmable device is coupled to the one optical cable a point in the network where a simulated cable failure is desired.

9. The network of claim 6, wherein the at least one programmable device comprises a switch, control logic, and a converter.

10. The network of claim 9, wherein the converter comprises a gigabit interface converter (GBIC).

* * * * *